United States Patent [19]
Botkins

[11] Patent Number: 5,613,319
[45] Date of Patent: Mar. 25, 1997

[54] DITCHLINE CRAWFISH TRAP

[76] Inventor: L. T. Botkins, P.O. Box 1663, Paragould, Ark. 72451

[21] Appl. No.: 500,349
[22] Filed: Jul. 10, 1995
[51] Int. Cl.⁶ ........................................................ A01K 61/00
[52] U.S. Cl. ................................................. 43/103; 43/100
[58] Field of Search ............................... 43/4, 100, 103, 43/104, 55, 56, 105; D22/121; 285/382.7, 398

[56] References Cited

U.S. PATENT DOCUMENTS

| | | | |
|---|---|---|---|
| D. 273,883 | 5/1984 | Sundberg | D22/119 |
| 2,551,236 | 5/1951 | Bergman | 43/100 |
| 2,755,594 | 7/1956 | Booth et al. | 43/56 |
| 3,271,894 | 9/1966 | Manno et al. | 43/100 |
| 3,387,403 | 6/1968 | Crouch | 43/65 |
| 3,916,558 | 11/1975 | Crouch | 43/65 |
| 4,221,070 | 9/1980 | Swindell | 43/100 |

*Primary Examiner*—J. Elpel
*Attorney, Agent, or Firm*—Norman B. Rainer

[57] ABSTRACT

A kit is provided for producing a crawfish trap employing cylindrical sidewalls derived from three identical cans such as cans utilized for the packaging of food products. The kit includes two connector collars for securing the sidewalls to form an elongated cylindrical structure having opposed open extremities, and two funnel members adapted to fit into the open extremities.

5 Claims, 2 Drawing Sheets

DITCHLINE CRAWFISH TRAP

BACKGROUND OF THE INVENTION

1. Field of the Invention

This invention concerns the gathering of crawfish, and more particularly relates to a kit for constructing a trap useful for capturing crawfish that reside in muddy drainage ditches.

2. Description of the Prior Art

Crawfish, also known as crayfish, is a fresh-water crustacean closely related to the lobster. It generally lives in and along lakes and rivers of every continent except Africa. Although various species exist, the crawfish seldom grows over six inches long. In drainage ditches that border roads and farmlands, the crawfish lives in burrows that communicate with the underlying ground water. The burrowing activity produces piles of mud or "chimneys" above the burrow which interfere with mowing machines and other maintenance equipment.

The crawfish is gathered and sold for food in many countries. In certain areas, crawfish are raised in captivity for food purposes. In addition to its value as a food item for human consumption, the crawfish is also prized as a fishing bait. Those crawfish that are captured from random drainage ditches are not particularly suited for human consumption because of the uncertainty concerning the environment in which the crawfish lived. For example, the crawfish may be tainted with pesticides, herbicides or other toxic substances. Accordingly, those crawfish derived from uncontrolled drainage ditches are best utilized as fishing bait.

Devices for trapping and/or retaining bait fish such as minnows are well known. A particularly successful embodiment of such devices is fabricated of metal screening in an elongated such devices is fabricated of metal screening in an elongated design comprised of two interactively connected frustro-conical sections. Such designs are disclosed in U.S. Pat. Nos.: 897,589; 2,076,972; 3,387,403 and 3,916,558.

It has now been found however, that trap designs suitable for minnows are not suitable for use in catching crawfish in ditchline situations. It has also been found that, because the crawfish is a territorial creature that inhabits and defends a certain region, they exist in relatively low population density. Consequently, a large number of traps are needed to harvest a reasonable number of crawfish. This requires not only that the traps be inexpensive, but also that, in the course of storage or transportation, they occupy minimal space.

It is accordingly an object of the present invention to provide a trap for the capture of crawfish.

It is another object of this invention to provide a trap as in the foregoing object which is effective in a ditchline situation.

It is a further object of the present invention to provide a kit for the production of a trap of the aforesaid nature.

It is still another object of this invention to provide a kit of the aforesaid nature which occupies minimal space when stored.

These objects and other objects and advantages of the invention will be apparent from the following description.

SUMMARY OF THE INVENTION

The above and other beneficial objects and advantages are accomplished in accordance with the present invention by a crawfish trap comprised of a segmented circular cylindrical section which defines an interior region and terminates in opposed extremities, and a funnel-shaped member inserted into each extremity in a manner whereby the narrowest portion of said funnel members are directed toward the axial center of said interior region. The cylindrical section is fabricated from three pieces of cylindrical sidewall derived from metal cans of identical diameter. The kit of the present invention is comprised of two connector collars for coupling said sidewalls, and two funnel-shaped insert members.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
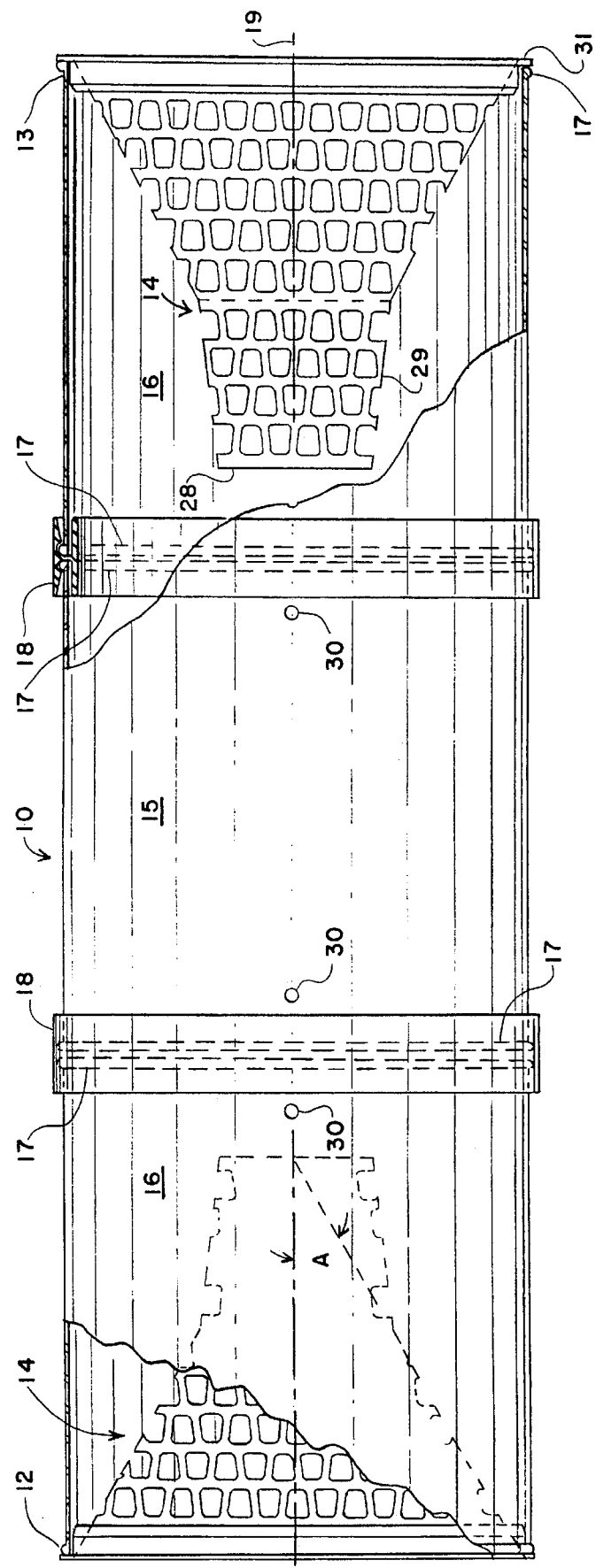
FIG. 1 is a side view of a crawfish trap constructed from and incorporating an embodiment of the kit of the present invention, portions being broken away to reveal interior details.

Referring to FIGS. 1–4, an embodiment of the crawfish trap of the present invention is shown comprised of segmented circular cylindrical section 10 which defines interior region 11, and terminates in opposed extremities 12 and 13. Funnel members 14 are inserted into each extremity.

Cylindrical section 10 is comprised of center segment 15 and end segments 16. Said segments are of identical diameter and are pieces of cylindrical sidewall derived from metal cans. Typical metal cans which can provide said sidewall segments are those employed for the preservation and storage of food products. Such cans may be characterized as having identical top and bottom lids that join the sidewall, forming therewith a circular rim 17. Such cans are generally opened by use of an opener device which travels along the rim and cuts through the lid. Once opened and discharged of their contents, such cans are generally considered to have no further use, and are discarded as trash. Cans suitable for use in providing the segments for the trap preferably have a diameter of about six inches. Typically, one gallon food cans and two pound coffee cans, which are commonly abundant serve well for the purposes of this invention. The sidewall segments are preferably painted to prevent corrosion. A dull black finish is preferable because it eliminates reflective surfaces that would frighten the crawfish. Holes 30 may be drilled into the sidewall segments to permit attachment of a handle which facilitates the handling of the trap.

Figure 4:
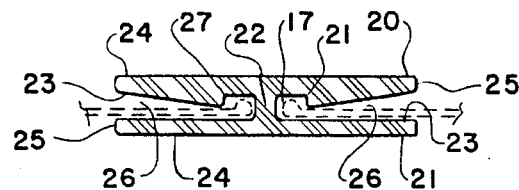
FIG. 4 is an enlarged sectional view taken in the direction of the arrows upon the line 4—4 of FIG. 3.

Center segment 15 is joined at both extremities to end segments 16 employing connector collars 18 which engage the rims of the several segments in a manner to dispose the segments upon common center axis 19. The connector collars are monolithic circular rings fabricated of plastic material as in a molding operation or by the bending and joining of extruded stock. As best shown in FIG. 4, the collars are comprised of outer and inner panels 20 and 21 respectively, joined at their midlines by transverse portion 22 to produce a generally H-shaped cross-section. Said panels are bounded in part by facing surfaces 23, flat exterior surfaces 24, and lateral edges 25, whereby two transverse portion 22 and opening at said edges 25.

The facing surface 23 of at least one of said panels 20 and 21 is preferably inclined in a manner to produce a wedge configuration whose taper approaches the opposite facing surface 23 with progression from edge 25 toward transverse portion 22. The wedge configuration terminates short of reaching said transverse portion, and is replaced with recesses that represent paired annular retaining notches 27. By virtue of the aforesaid manner of construction, the wedge structure permits entrance of the outwardly projecting rim of a can. Once the rim has entered notch 27, the resilient nature of the plastic springs into locking engagement with the rim.

Said funnel members 14 are perforated structures of frustro-conical shape. The angle of convergence of the conical shape, defined as the angle A between center axis 19 and the trace of the conical surface within the plane containing axis 19, is preferably in the range of 25 degrees to 35 degrees. The narrowest extremity 28 of funnel member 14 is directed toward the center of interior region 11 and is located at a site between 60% and 90% of the length of end segment 16.

Figure 2:
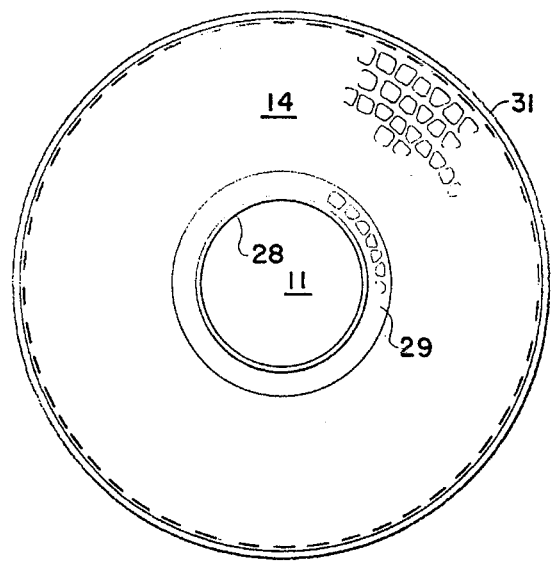
FIG. 2 is an end view of the trap of FIG. 1.
Figure 3:
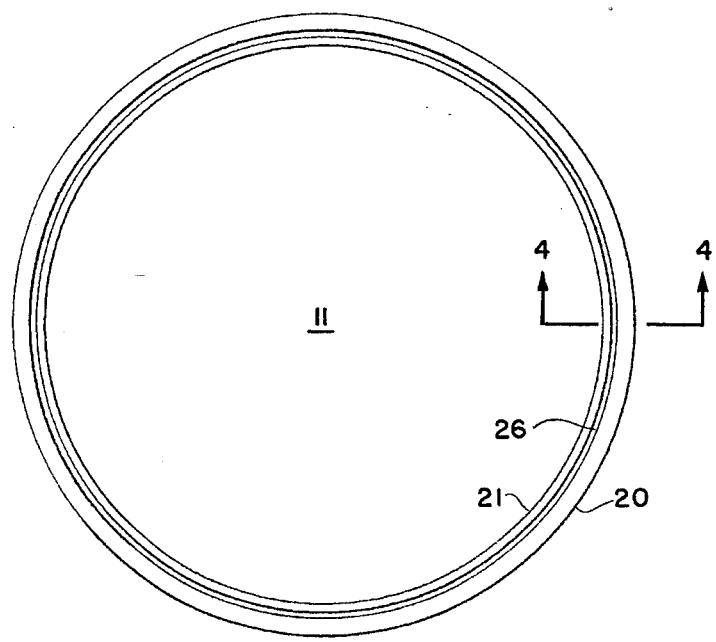
FIG. 3 is an enlarged end view of the connector collar component of the trap of FIG. 1.

The funnel member may be fabricated of coarse screen material or punched sheet metal stock, as exemplified in FIGS. 1 and 2. The funnel member may be configured either as a simple frustro-conical shape, or may have a secondary zone 29 adjacent the narrowest extremity, said zone being of either cylindrical shape or of conical contour having a convergence angle smaller than angle A. The large diameter extremity 31 of the funnel member engages the rim 17 of end segment 16, and is secured thereto either by way of a friction fit, wire clips or equivalent means. The funnel members permit the crawfish to enter the trap from either direction. When not in use, the funnel members can be stored in a space-saving nested state, and the collars can be stored on the funnels.

A bait is emplaced within the assembled trap to lure the crawfish. Because the sidewall structure of the trap is solid, as opposed to the mesh structure of minnow traps, the crawfish are directed toward the extremities of the trap. The trap of the present invention performs successfully because of the crawling behavioral characteristic of the crawfish. Minnow traps, constructed so as to accommodate the swimming behavioral characteristic of fish, are not effective in capturing crawfish.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A kit for producing a crawfish trap from three pieces of cylindrical sidewall derived from metal cans of identical diameter and having extremities having circular rims, said kit comprising:

a) two identical connector collars in the form of monolithic circular rings comprised of outer and inner panels interconnected at their midlines by a transverse portion to produce a generally H shaped cross-sectional configuration defining two holding zones in symmetrical opposition about said transverse portion and adapted to receive said circular rims and thereby couple said sidewalls to produce a segmented cylindrical section elongated upon a center axis and terminating in opposed open extremities, and b) two funnel members in the form of perforated structures of frustro-conical shape having a narrow opening and an opposed wide opening associated with a conical surface configured to insert into the open extremities of said cylindrical section.

2. The kit of claim 1 where said collars include retaining notches to receive said rims which project outwardly from said sidewalls.

3. The kit of claim 1 wherein said holding zones have retaining notches for resiliently engaging the rims of said sidewalls.

4. The kit of claim 1 wherein the angle of convergence of said conical shape, measured between said center axis and the trace of said conical shape within a plane containing said axis, is in the range of 25 to 35 degrees.

5. The kit of claim 1 wherein the size of said funnel members is such that, when inserted into one of said cylindrical sidewall pieces such that said wide opening abuts a respective rim, said narrow opening is located at a site between 60% and 90% of the distance between said wide opening and the transverse portion of the closest collar.

* * * * *